United States Patent [19]

Petisce

[11] Patent Number: 5,181,269
[45] Date of Patent: Jan. 19, 1993

[54] OPTICAL FIBER INCLUDING ACIDIC COATING SYSTEM

[75] Inventor: James R. Petisce, Norcross, Ga.

[73] Assignee: AT&T Bell Laboratories, Murray Hill, N.J.

[21] Appl. No.: 761,135

[22] Filed: Sep. 17, 1991

[51] Int. Cl.$^5$ .............................. G02B 6/22
[52] U.S. Cl. .................. 385/128; 385/126; 427/163
[58] Field of Search ............ 385/128, 126, 127; 65/3.43; 427/163, 434.7

[56] References Cited

U.S. PATENT DOCUMENTS

| | | | |
|---|---|---|---|
| 3,829,675 | 8/1974 | Mariani | 385/901 |
| 4,843,111 | 6/1989 | Yokoshima et al. | 385/128 X |
| 4,929,051 | 5/1990 | Rogler et al. | 385/141 |
| 4,956,198 | 9/1990 | Shama et al. | 427/54.1 |
| 4,969,711 | 11/1990 | Rogler et al. | 385/128 |

FOREIGN PATENT DOCUMENTS 9003988  4/1990  PCT Int'l Appl.

Primary Examiner—John D. Lee
Assistant Examiner—S. W. Barns
Attorney, Agent, or Firm—E. W. Somers

[57] ABSTRACT

A coated optical fiber (30) includes optical glass fiber which has been drawn from a preform and provided with one or more layers of coating materials having defined properties. The layer (32) of coating material which is contiguous to the drawn glass fiber may be one which in a preferred embodiment is cationically cured coating material. Curing of the cationically cured coating material causes an acid to be generated. The acid which has a relatively long life is effective to reduce sufficientlythe pH of the environment in contact with the drawn glass to cause the coated optical fiber to have enhanced mechanical strength.

16 Claims, 2 Drawing Sheets

OPTICAL FIBER INCLUDING ACIDIC COATING SYSTEM

TECHNICAL FIELD

This invention relates to an optical fiber including an acidic coating system which enhances the strength of the optical fiber. More particularly, this invention relates to an optical fiber having a cationically cured coating material thereon which results in enchanced strength properties.

BACKGROUND OF THE INVENTION

Optical fiber has taken off from its embroyonic stage as a communication medium about a dozen years ago to its present status as a world class medium for reliable communications. Typically, optical fiber includes a fused silica portion comprising a core and a cladding and one or more layers of coating material. The coating material protects the fiber which is drawn from a preform.

It has been conventional that the optical fiber coating materials be acrylate-based ultraviolet curable materials which include photoinitiators. These materials cure, i.e., are converted from a liquid to a solid, by what is referred to as free radical cure. In a free radical cure system, upon absorption of light, the photoinitiator component cleaves to form a pair of free radicals. This free radical pair diffuses first from each other and reacts with arcylate-terminated components to initiate a free radical chain polymerization process. Acrylate-based coating systems are known to be chemically neutral, that is neither acidic or basic by design.

Another group of coating materials are cationically curable. In cationic cure, a cation or a proton is both the initiating and the propagating species in the polymerization mechanism. See U.S. Pat. No. 4,956,198 and PCT application publication No. WO90/03988. In the latter, cationic cure, which may be used on fiber coatings is such that polymerization continues even after the exposure to curin energy has been discontinued, whereas in free radical cure, the polymerization reaction may be incomplete inasmuch as the reaction discontinues when exposure to curing energy is discontinued.

It has long been desired to increase the strength of the optical fiber from its present prooftest value of about 50,000 psi and to cause the strength to be uniform throughout a length of fiber. An optical fiber which has been provided with a hermetic coating has a prooftest value which may reach 200,000 psi. However, difficulties experienced in the manufacture and coloring of hermetic coated optical fiber have hindered its widespread acceptance.

It is known that fused silica optical fiber strength is higher after aging in acidic environments than it is after aging in neutral or passive environments. See, for example, H. C. Chandan and D. Kalish "Strength and Dynamic Fatigue of Optical Fibers Aged In Various pH Solutions" which appeared at pp. 12-14 of the *Proceedings of the Topical Meeting on Optical Fiber Communication*, Washington, D.C. 1979.

With the quest for uniform strengths, there is a desire to provide a mechanism for causing fiber strengths to be higher and more uniform. A long-felt need for optical fibers has been to increase their strength and resistance to stress cracking. Such properties would result in a more reliable communication system. The resultant optical fiber could be used in applications where higher strengths are required, such as in underwater cable or in tethered vehicles. Seemingly, the art has not yet provided a solution to the problem of increased fiber strengths which solution would not detract from cure speed and which solution would be relatively easy to implement.

SUMMARY OF THE INVENTION

The foregoing problems of the prior art have been overcome by the coated optical fiber of this invention. A coated optical fiber comprises an optical glass portion which includes a core and a cladding and a coating system which is disposed about and which includes a portion in engagement with the cladding. The coating system includes at least one layer which comprises a material which causes the optical glass portion to be contacted by an environment which is sufficiently acidic to enhance the strength of the coated optical fiber.

In a preferred embodiment, the coating system is such that at least a portion thereof is cured cationically.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
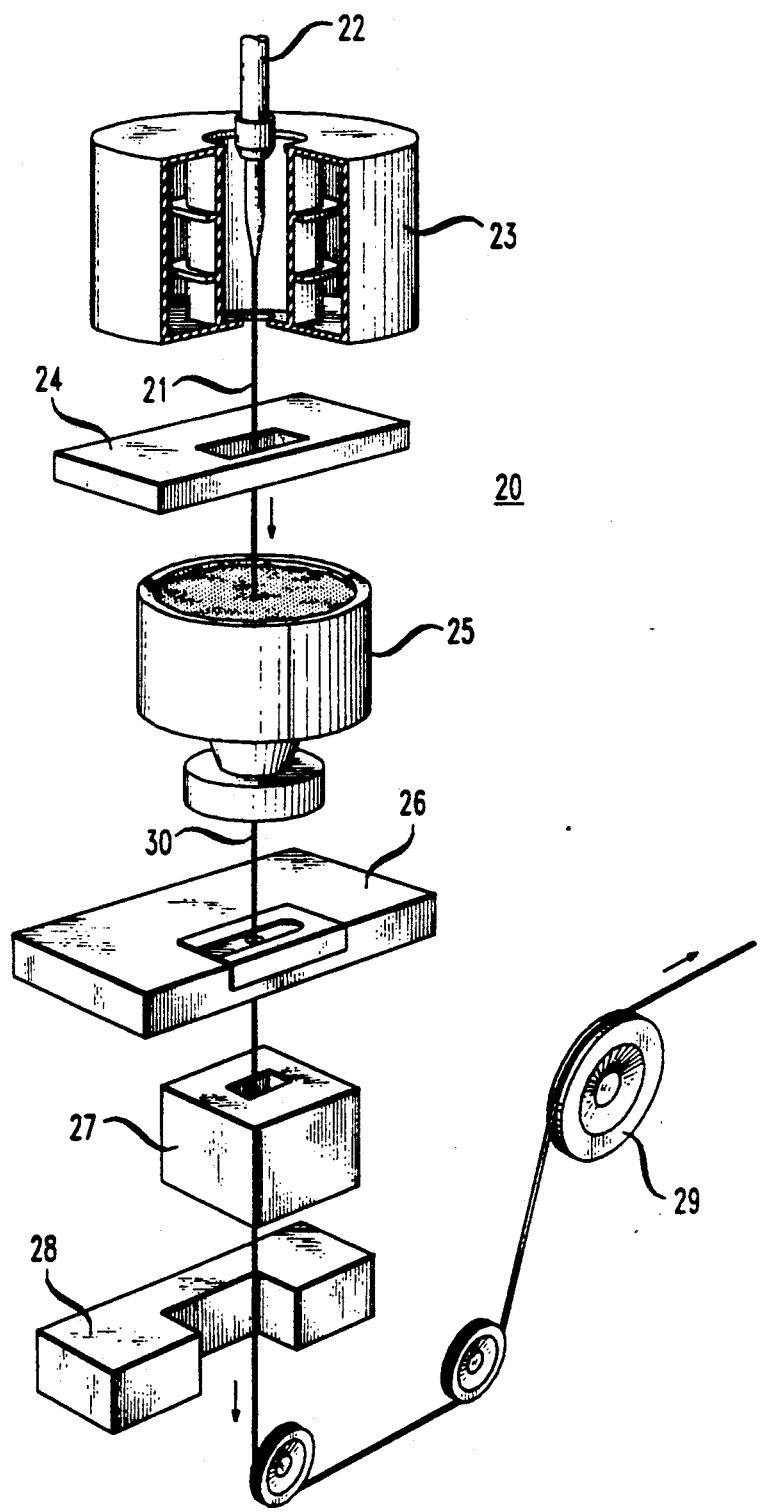
FIG. 1 is a schematic view of a manufacturing line on which optical glass fiber is drawn from a preform and then provided with a coating system.

Referring now to FIG. 1, there is shown an apparatus which is designated generally by the numeral 20 and which is used to draw glassy optical fiber 21 from a specially prepared cylindrical preform 22 and then to coat the optical fiber. The optical fiber 21 is formed first by locally and symmetrically heating the preform 22 to a temperature of about 2000° C. As the preform 22 is fed into and through a furnace 23, optical fiber 21 is drawn from the molten material.

As can be seen in FIG. 1, the draw system includes the furnace 23, wherein the preform 22 is drawn down to the optical fiber size, after which the optical fiber 21 is pulled from the heat zone. The diameter of the optical fiber 21 which is measured by a device 24 at a point below the furnace 23 becomes an input into a control system. Within the control system, the measured diameter is compared to the desired value and an output signal is generated to adjust the draw speed such that the fiber diameter approaches the desired value.

After the diameter of the optical fiber 21 is measured, a protective coating system is applied by an apparatus 25 to provide a coated optical fiber 30. One method of applying dual layers of coating materials to a moving optical fiber is disclosed in U.S. Pat. No. 4,474,830 which issued on Oct. 2, 1984, in the name of C. R. Taylor. Another system for applying dual coatings on drawn optical fibers is disclosed in U.S. Pat. No. 4,851,165 which was issued on Jul. 25, 1989 in the names of J. A. Rennell and Carl R. Taylor.

Then, after the coated optical fiber 30 is passed through a concentricity gauge 26, an ultraviolet light (UV) device 27 for treating the coating material to cure the coating material and a device 28 for measuring the outer diameter of the coated fiber, it is moved through a capstan 29 and is spooled for testing and storage prior to subsequent operations or sale. The preservation of the intrinsically high strength of optical fibers is important during their ribboning, jacketing, connectorization and cabling and during their service lives.

Figure 2:
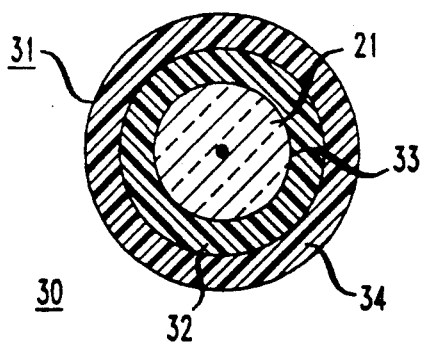
FIG. 2 is an end view in cross section of optical fiber which includes a coating system.

A coating system 31 (see FIG. 2) which is applied to the optical fiber after it has been drawn from the preform preferably comprises two layers of radiation cured polymeric materials. An inner layer 32 which contacts the glassy optical fiber 21 at a glass-coating interface 33 is referred to as the primary coating material and an outer layer 34 is referred to as the secondary coating material. Typically, the primary and the secondary coating layers each have a thickness of about 30 μm.

The coated optical fiber 30 must meet desired performance characteristics. For example, the coated fiber must have excellent transmission characteristics. It must remain intact although subjected to handling and the environment, it must be capable of being connected to other coated optical fiber or to devices and it must be capable of being tested.

More specifically, the interface between the primary coating material and the glass fiber must be characterized by suitable strength to prevent delamination and must be such that the coating system can be stripped from the optical fiber without tenacious residues being left on the fiber surface. On the other hand, the surface of the secondary coating material must be such that tacking does not occur between adjacent convolutions of the fiber, resulting in a jerky payoff from a process spool. Also, the outer surface of the secondary coating must be such that it is compatible with the application of a relatively thick extruded overcoating which may be referred to as buffering and/or colorant materials used for identification in multifiber units. Importantly, the coated optical fiber must have suitable dynamic and static fatigue resistance which are at least the industry standards.

The optical fiber of the preferred embodiment of this invention includes a cured primary coating material which maintains an ambient environment having a pH of less than 7 about the glass fiber. The primary coating material includes a component that upon curing generates an environment which is sufficiently acidic in order to increase the strength of the coated optical fiber. Of course, the secondary coating material may include a component which generates such an environment.

As mentioned hereinbefore, most optical fiber coatings used today in the manufacture of coated optical fiber are UV curable acrylate-based materials which are converted from a liquid to a solid by a free radical polymerization mechanism. For example, ultraviolet-curable coatings based on acrylate-terminated polyurethanes are well known. These cure in the presence of a free-radical polymerization catalyst initiated with ultraviolet light. Acrylate-based coating systems, as was mentioned hereinbefore, are known to be chemically neutral.

In order to provide an acidic environment around the drawn optical fiber, an acidic terminated acrylate may be mixed into optical fiber coating formulations to obtain a lower pH. Unfortunately with this approach, the cure speed may be decreased which is an unacceptable result. Also, it is not feasible simply to add an acid as a constituent to a curable composition.

The coated optical fiber 30 of the preferred embodiment of this invention is coated with a system which includes vinyl ether-terminated oligomers, especially polyurethane oligomer. Vinyl ether, in contrast to acrylate-based coatings, is converted from a liquid to a solid by a cationic polymerization mechanism.

Vinyl ether-terminated polyurethanes are described in Bishop, Paternack and Cutler U.S. Pat. No. 4,472,019 and also in Lapin and House U.S. Pat. No. 4,751,273, both of which are incorporated by reference hereinto. In each of these prior disclosures, the vinyl ether-terminated polyurethane is formed by the reaction of an aliphatic monohydric vinyl ether with a diisocyanate.

Cationically cured coating systems of this invention are used in order to provide an environment in contact with the drawn glass fiber which is sufficiently acidic to increase the dynamic and static fatigue resistance of the coated optical fiber. Two basic chemistries may serve as examples of such a coating system which provides such an acidic environment for fiber. These are vinyl ether formulations or epoxy terminated materials. These two are used in contrast to a free radical cure system. The cationically cured formulations of this invention include a photoinitiator which, upon the absorption of light, generates a strong acid. When they are cured, the photoinitiator, not the vinyl ether or epoxy, absorbs light and undergoes a reaction to generate the acid. Subsequently, the photogenerated acid reacts with a vinyl ether or an epoxy terminated component to generate a cation which can react with neutral epoxy or vinyl ether components to propagate further the polymerization reaction. After irradiation, a latent acid is present and continues to exist for a relatively long time. In contrast, in a free radical cure system, there may be some free radicals present in which the latency lasts for a relatively short period of time.

Cationic cure is one mechanism by which the coating material is converted from a liquid to a solid upon exposure to light. Cationic cure may be affected by ultraviolet or by visible light or by thermal means. The difference between cationic cure and free radical cure is that in cationic cure, a cation, $R^+$, or a proton, $H^+$, is both the initiating and the propagating species in the polymerization mechanism. $R^+$ is a cationic chemical species that is deficient by one electron. The photoinitiator absorbs light and generates $R^+$ or $H^+$. In free radical cure, the species includes a free radical which is a reactive chemical species that has one unpaired electron. The cation is a strong electron acceptor and as such has the ability to accept electrons from a cationically curable end group thereby initiating or propagating polymerization.

More particularly, a mechanism by which a cationically polymerizable coating formulation is converted from a liquid to a solid is shown in the following equations. In equation (a), a diaryliodonium photoinitiator, $Ar_2I^+X^-$, generates a strong Bronsted acid, HX, such as $HBF_4$, $HAsF_6$, $HPF_6$, for example, upon photolysis caused by absorption of light, hν, and subsequent reaction with a proton donor, SH.

   (a)

Additional products, ArI, Ar· and S·, are also formed but do not participate in cationic polymerization. The photoinitiator in equation (a) is illustrative of a photoinitiator class which upon photolysis generates a Bronsted acid which is sufficiently strong to affect the pH of the environment which is adjacent the glassy portion of the optical fiber and to enhance the strength of the coated optical fiber. Triarylsulfonium salts also generate strong Bronsted acids, for example, upon light absorption.

Typically a UV curable composition includes a photoinitiator, an oligomeric resin, one or more diluents and additives. The oligomeric resin component is multifunctional in that it includes more than one end group which can react with the photogenerated Bronsted acid to produce a cationic species. Similarly, the diluent component or components also are capable of reacting with the photogenerated Bronsted acid to produce a cationic species. This is shown in equation (b) where species (i) is either an oligomeric resin component or a difunctional diluent component. As shown in equation (b), the Bronsted acid reacts with a cationically polymerizable component, (i), of the coating material such as, for example, an oligomer or a diluent to initiate polymerization.

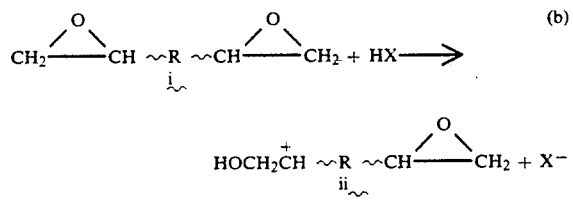   (b)

This initiation reaction generates a cationic species (ii) and the corresponding conjugate base of the Bronsted acid, X⁻. The cationic species (ii) is the reaction product of the photogenerated Bronsted acid and the oligomeric component or of the photogenerated Bronsted acid and the diluent component. The cationic species (ii) can react subsequently with a monofunctional component (iii) as shown in equation (c) or with a difunctional component (v) as shown in equation (d) to propagate the cationic polymerization reaction as shown in equations (c) and (d), respectively.

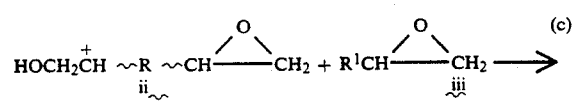   (c)

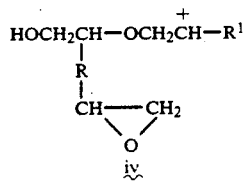

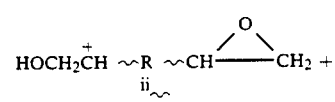   (d)

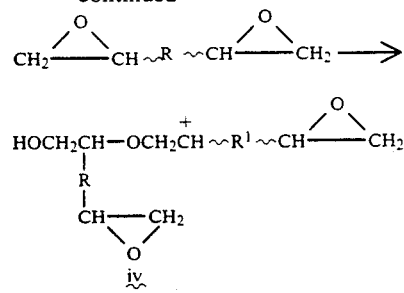

It is noteworthy that the propagation reaction shown in equation (d) generates a crosslink between difunctional components (ii) and (v), yielding an intermediate crosslinked species (vi). Subsequently, the intermediate crosslinked species, (vi), reacts further with a monofunctional type component such as (iii), for example, or a difunctional component such as (v), for example, to continue or propagate the cationic polymerization chain reaction and form crosslinks between those components. These crosslinks are primarily responsible for the formation of the ultimate mechanical and physical properties of the cured coating material.

The result of the initiation reaction (b) and propagating reactions (c) and (d) is the conversion of the coating material from a liquid to a solid which conversion also is referred to as cure.

The epoxy terminated species shown in the foregoing equations are illustrative of cationically polymerizable components only. Other compositions including cyclic ether, lactone, vinyl ether, or styrenic groups also can be cationically polymerized, for example. A general reference for cationic polymerization appears in Crivello, J. V. "Photoinitiated Cationic Polymerization", in UV Curing: Science and Technology, S. Peter Pappas, Ed., Technology Marketing Corp., 1980, 23-76.

As described above, the photoinitiator generates a strong Bronsted acid upon photolysis. See equation (a). Only a portion of this photogenerated acid reacts irreversibly with cationically polymerizable coating constituents such as an oligomer resin or one or more diluents. Consequently, consumption of the cationically polymerizable constituents produces a cured coating formulation having Bronsted acid entangled in the crosslinked coating material. Subsequently, the coating material in intimate contact with the glassy optical fiber cladding affords an acidic environment surrounding and contacting the optical fiber glass surface. It is also possible that Bronsted acid entangled in the bulk of a crosslinked coating material spaced from the glass interface may diffuse through to the optical fiber-coating material interface, producing an environment disposed about the optical fiber glass surface which is sufficiently acidic to enhance the strength of the coated optical fiber.

The chemistry of cationic cure to optimize the pH of the cured coating is by suitable choice of the photoinitiator, or the concentration of the photoinitiator or by manipulating the concentration of the vinyl ether and epoxy end groups of the coating formulation. Should a different amount of acid be needed, it can be provided by varying the amount of photoinitiator and/or vinyl ether or epoxy end groups, for example.

The typical proportion of cationic photoinitiator which is suggested for cationic polymerization is in the range of 1% to 4%, usually 3% to 4%, by weight. It has been found that a very rapid cure producing superior cured properties is obtained by using smaller weight percent amounts of a cationic photoinitiator.

In the coated optical fiber 30 of this invention, the acid which has been generated persists for some time after processing. The lifetime of the generated acid is much longer compared to free radicals which are generated from corresponding photoinitiators. This is advantageous because the fiber strength increases, without any diminution of the cure rate. Optical fiber coatings continue to cure well after the initial exposure to curing light on a draw tower. The advantage is the long lived, latent acidic component in the cationically cured material which can affect a low pH environment about the glass substrate and result in an enhanced strength characteristic of the coated optical fiber. Enhanced glass strength is obtained because static fatigue resistance of optical fiber is pH dependent; the lower the pH, the greater the static fatigue resistance. Further, it is believed that the toxicology of cationically cured optical fiber coatings is more benign than acrylate-based materials. Still further, their cure speed in some cases is greater than acrylate-based materials because their cure is not inhibited by oxygen.

Apparently, the added fiber strength benefit of cationically cured coating materials has not yet been considered by the industry. Although optimal pH values have been suggested in the literature by immersing the optical fiber in different pH solutions, there appears to be nothing in the prior art which suggests a coating which exposes the glass fiber to an environment of a pH value which is sufficiently acidic to enhance the strength of the coated optical fiber. To date, it appears that the effect of the local environment on the strength of the coated glass fiber by formulating a coating with a lower pH value has not been considered.

The optical fiber of the preferred embodiment of this invention includes a layer of a coating material which is contiguous to the drawn glass which includes resin which is terminated with cationically curable end groups such as vinyl ether or epoxy, a diluent which is terminated with cationically curable end groups, a photoinitiator, additives and, possibly, colorant constituents. The additives are stabilizers which are included to enhance the stability, such as oxidative, hydrolytic or shelf life, for example, of the fiber coating. The photoinitiator absorbs lights and generates acid, and as a result of the cationic cure, a latent acid species is present in the polymer which reduces its pH at the glass-coating interface.

The cationically cured layer of coating material should be the one, in the event that multiple coatings are used, contiguous to the glassy portion of the optical fiber. However, if such a coating material is needed as a secondary coating spaced from the glass fiber by the primary coating, there could be residual acid which diffuses through the primary coating to the glassy portion.

Figure 3:
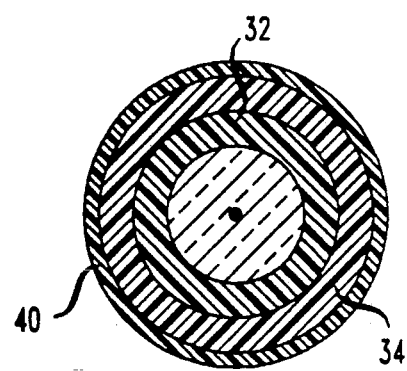
FIG. 3 is an end view in cross section of optical fiber which comprises a coating system which includes a colorant material.

It should be understood that the coating system which includes the material which provides the acidic environment for the glassy portion of the optical fiber may be other than that described thus far. For example, a coating system for an optical fiber may include one or more layers of coating materials which protect the glassy portion of the optical fiber and a layer 40 (see FIG. 3) of a colorant material for example. The colorant material such as an ink, for example may be cationically curable, for example, such that it provides an acidic component which diffuses through a layer or layers of coating materials to provide a suitable acidic environment for the glass-coating layer interface. Such a colorant material may be referred to as a strength enhancing colorant material.

Figure 4:
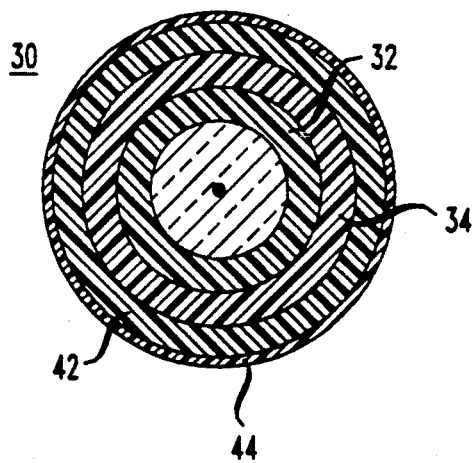
FIG. 4 is an end view in section of a buffered optical fiber which includes a layer of a colorant material.
Figure 5:
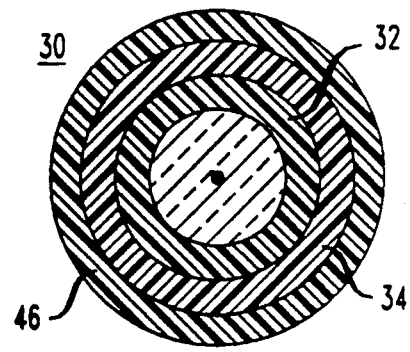
FIG. 5 is an end sectional view of an optical fiber which includes a layer of buffering material which includes a colorant material.

Other embodiments are shown in FIGS. 4 and 5. In FIG. 4, a coated optical fiber 30 is provided with a layer 42 of a buffering material such as polyvinyl chloride (PVC), for example. About the layer 42 of buffering material may be disposed a layer 44 of a colorant material. Either the layer 42 or the layer 44 may be such as to provide an environment for the glass-coating interface which is sufficiently acidic to enhance the strength of the coated optical fiber. In FIG. 5, a coated optical fiber 30 is provided with a layer 46 of a buffering material which may include a colorant material and which is such that it provides a suitable acidic environment for the glass-coating interface.

Figure 6:
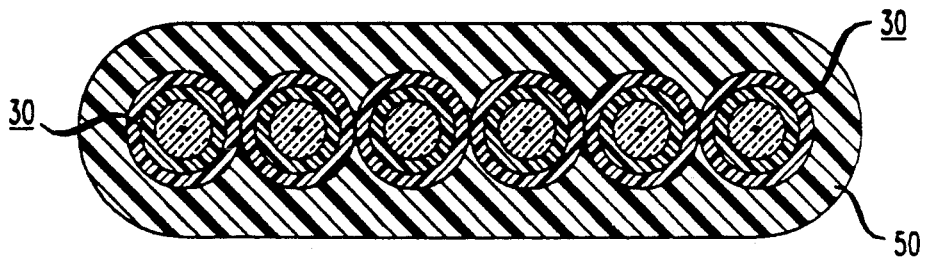
FIG. 6 is an end view in cross section of a plurality of optical fibers held in an array by a matrix material.

Also, the coated optical fibers may be included in a matrix material 50 (see FIG. 6), several configurations of which are disclosed in U.S. Pat. No. 4,900,126 which issued on Feb. 13, 1990 in the names of K. W. Jackson, G. A. Lockhovic, P. D. Patel, M. L. Pearsall and J. R. Petisce, and which is incorporated by reference hereinto. The coating system includes not only the layers of coating material used to protect the fibers, but also the matrix material 50 which is used to maintain the fibers in an array. In this embodiment, the matrix material 50 may be cationically curable to provide the sufficiently acidic environment for the glass-coating interface.

It is to be understood that the above-described arrangements are simply illustrative of the invention. Other arrangements may be devised by those skilled in the art which will embody the principles of the invention and fall within the spirit and scope thereof.

I claim:

1. A coated optical fiber having enhanced strength, said coated optical fiber comprising:
   an optical glass portion which includes a core and a cladding; and
   a coating system which is disposed about and which has a portion thereof in engagement with said cladding, the coating system including at least one layer which comprises a material which causes the optical glass portion to be contacted by an environment which is sufficiently acidic to enhance the strength of the coated optical fiber.

2. The coated optical fiber of claim 1, wherein the coating system is such that at least a portion thereof is cationically cured.

3. The coated optical fiber of claim 1, wherein the coating system has been cured by ultraviolet light.

4. The coated optical fiber of claim 1, wherein the coating system has been cured by visible light.

5. The coated optical fiber of claim 1, wherein the coating system has been cured by thermal energy.

6. The coated optical fiber of claim 1, wherein the coating system is cured by ultraviolet and by visible light.

7. The coated optical fiber of claim 1, wherein said at least one layer of said coating system comprises a composition which includes a resin which is terminated with cationically cured end groups, a diluent which is terminated with cationically cured end groups and a photoinitiator.

8. The coated optical fiber of claim 7, wherein said coating system also includes a stabilizing system.

9. The coated optical fiber of claim 7, wherein said coating system also includes a colorant constituent.

10. The coated optical fiber of claim 7, wherein said resin is selected from the group consisting of vinyl ether and epoxy constituents.

11. The coated optical fiber of claim 7, wherein the photoinitiator constituent ranges from about 1 to 5 weight percent, said resin ranges from about 60 to 90 weight percent and the diluent from about 5 to 39 weight percent of said composition.

12. The coated optical fiber of claim 1, wherein said at least one coating layer is contiguous to said optical glass portion.

13. The coated optical fiber of claim 1, which includes an optical fiber having a coating system which includes at least one layer of a coating material disposed about said optical glass portion and a layer of a colorant material which is disposed about said at least one layer and which is capable of providing the sufficiently acidic environment about said optical glass portion.

14. The coated optical fiber of claim 13, which also includes a layer of buffering material interposed between said layer of colorant material and said at least one layer of coating material, said layer of buffering material also being capable of providing the sufficiently acidic environment about said optical glass portion.

15. The coated optical fiber of claim 1, which includes an optical fiber having a coating system which includes at least one layer of a coating material disposed about said optical glass portion and a layer of a colorant material which is disposed about said at least one layer of coating material and a layer of buffering material interposed between said at least one layer of coating material and said layer of colorant material, said layer of buffering material capable of providing the sufficiently acidic environment about said optical glass portion.

16. An optical fiber ribbon which includes a plurality of coated optical fibers of claim 1, wherein a plurality of optical glass portions are disposed in an array and said coating system includes at least one layer of a coating material which is disposed about each optical glass portion and said coating system further includes a matrix material which is disposed about the plurality of optical glass portions and which is capable of providing the sufficiently acidic environment about said optical glass portions.

* * * * *